United States Patent [19]
Chatterji et al.

[11] Patent Number: 5,945,387
[45] Date of Patent: Aug. 31, 1999

[54] POLYMERIC WELL COMPLETION AND REMEDIAL COMPOSITIONS AND METHODS

[75] Inventors: Jiten Chatterji; David D. Onan, both of Duncan; Roger S. Cromwell, Walters, all of Okla.

[73] Assignee: Halliburton Energy Services, Inc., Duncan, Okla.

[21] Appl. No.: 08/881,108

[22] Filed: Jun. 23, 1997

Related U.S. Application Data

[63] Continuation-in-part of application No. 08/854,826, May 12, 1997.

[51] Int. Cl.[6] ............................. C09K 3/00; E21B 33/13
[52] U.S. Cl. .................... 507/224; 507/225; 507/231; 507/202; 166/285
[58] Field of Search .................... 507/224, 925, 507/225, 231, 202

[56] References Cited

U.S. PATENT DOCUMENTS

| | | | |
|---|---|---|---|
| 2,294,294 | 8/1942 | Grebe et al. | 166/22 |
| 3,334,689 | 8/1967 | McLaughlin | 166/33 |
| 3,490,533 | 1/1970 | McLaughlin | 166/270 |
| 3,910,856 | 10/1975 | Kruka et al. | 507/221 |
| 4,395,340 | 7/1983 | McLaughlin | 252/8.55 |
| 4,637,467 | 1/1987 | Shaw et al. | 166/295 |
| 4,836,940 | 6/1989 | Alexander | 507/119 |
| 4,912,186 | 3/1990 | Ohhara et al. | 526/323 |
| 5,091,471 | 2/1992 | Graves et al. | 525/90 |
| 5,098,836 | 3/1992 | Stahl et al. | 435/121 |
| 5,103,909 | 4/1992 | Morgenthaler et al. | 166/288 |
| 5,133,409 | 7/1992 | Bour et al. | 166/293 |
| 5,147,565 | 9/1992 | Bour et al. | 252/8.551 |
| 5,159,980 | 11/1992 | Onan et al. | 166/294 |
| 5,231,143 | 7/1993 | Abraham | 525/326.2 |
| 5,293,938 | 3/1994 | Onan et al. | 166/293 |
| 5,335,726 | 8/1994 | Rodrigues | 166/295 |
| 5,358,051 | 10/1994 | Rodrigues | 166/295 |
| 5,484,020 | 1/1996 | Cowan | 166/295 |
| 5,712,314 | 1/1998 | Surles et al. | 521/41 |

*Primary Examiner*—C. H. Kelly
*Attorney, Agent, or Firm*—Craig W. Roddy; C. Clark Dougherty, Jr.

[57] ABSTRACT

Polymeric well completion and remedial compositions which form highly pliable and durable impermeable masses of desired rigidity and methods of using the compositions are provided. The compositions are basically comprised of water, a water soluble polymerizable monomer, a polymerization initiator and an oxygen scavenging agent. The compositions are usually foamed and can contain a gelling agent and a solid filler material to increase the density and/or rigidity of the impermeable mass formed and/or a vulcanizable rubber latex, vulcanizing agent and vulcanizing activator to provide durability and other properties.

34 Claims, No Drawings

5,945,387

POLYMERIC WELL COMPLETION AND REMEDIAL COMPOSITIONS AND METHODS

This application is a continuation-in-part of application Ser. No. 08/854,826, filed on May 12, 1997.

BACKGROUND OF THE INVENTION

1. Field of the Invention

The present invention relates generally to polymeric well completion and remedial compositions which form highly pliable impermeable masses having desired properties and methods of using such compositions.

2. Description of the Prior Art

Hydraulic cement compositions have heretofore been utilized in subterranean well completion and remedial operations. For example, hydraulic cement compositions have been used in primary cementing operations whereby casings and liners are cemented in well bores. In performing primary cementing, a hydraulic cement composition is pumped into the annular space between the walls of a well bore and the exterior surfaces of a casing string or liner disposed therein. The cement composition is permitted to set in the annular space thereby forming an annular sheath of hardened substantially impermeable cement therein. The cement sheath physically supports and positions the casing or liner in the well bore and bonds the exterior surfaces of the casing or liner to the walls of the well bore whereby the undesirable migration of fluids between zones or formations penetrated by the well bore is prevented.

Set cement in wells, and particularly the rigid set cement in the annuluses between casing and liners and the walls of well bores, often fail due to shear and compressional stresses exerted on the set cement. Such stress conditions are typically the result of relatively high fluid pressures and/or temperatures inside pipe cemented in well bores during testing, perforating, fluid injection and/or fluid production. The high internal pipe pressure and/or temperature results in expansion of the pipe, both radially and longitudinally, which places stresses on the cement sheath causing it to crack or the bonds between the exterior surfaces of the pipe and/or the well bore walls and the cement sheath to fail in the form of loss of hydraulic seal.

Another condition results from exceedingly high pressures which occur inside the cement sheath due to the thermal expansion of fluids trapped within the cement sheath. This condition often occurs as a result of high temperature differentials created during the injection or production of high temperature fluids through the well bore, e.g., wells subjected to steam recovery or the production of hot formation fluids from high temperature formations. Typically, the pressure of the trapped fluids exceeds the collapse pressure of the cement and pipe causing leaks and bond failure.

In multi-lateral wells wherein liners have been cemented in well bores using conventional well cement slurries which set into brittle solid masses, the brittle set cement often cannot withstand impacts and shocks subsequently generated by drilling and other well operations carried out in the laterals without cracking or shattering.

In wells which are completed in oil containing reservoirs whereby the casing is rigidly cemented in the well bore, one or more rock formations above the reservoir often subside as the oil is produced which causes movement of the rock formations transversely to the well bore. Because the set cement surrounding the casing is rigid and inflexible, the movement of the rock formations often relatively quickly causes the casing to be severed or crushed.

The cement compositions utilized in primary cementing must often be lightweight to prevent excessive hydrostatic pressures from being exerted on formations penetrated by well bores. In some applications, the heretofore utilized lightweight cement compositions have had densities such that the cement compositions can not be displaced into well annuluses all the way to the surface due to the hydrostatic pressure of the cement compositions exceeding the fracture gradient of one or more formations penetrated by the wells. The resulting upper unsupported portion of the casing can and often does experience early damage due to formation cave-ins, subsidence and the like.

Thus, there are needs for improved well completion and remedial compositions and methods which unlike conventional hydraulic cement compositions form highly pliable impermeable masses which can withstand the above described stresses without failure.

SUMMARY OF THE INVENTION

The present invention provides polymeric compositions which form highly pliable impermeable masses having desired densities, durabilities, degrees of rigidity and compressibilities and methods of using the compositions which meet the needs described above and overcome the deficiencies of the prior art. A polymeric composition of this invention is basically comprised of water, a water soluble polymerizable monomer present in an amount in the range of from about 5% to about 30% by weight of the composition, an effective amount of a polymerization initiator and an effective amount of an oxygen scavenging agent. The polymeric composition is usually foamed whereby the composition is lightweight and forms a pliable impermeable mass which is compressible. A hydratable gelling agent is also generally included in the composition in an amount in the range of from about 0.25% to about 2% by weight of water in the composition along with a solid filler material present in an amount sufficient to impart a desired density and/or degree of rigidity to the composition.

Another more durable polymeric composition of this invention is comprised of water, a water soluble polymerizable monomer present in an amount in the range of from about 5% to about 30% by weight of the composition, an effective amount of a polymerization initiator, an effective amount of an oxygen scavenging agent, a vulcanizable aqueous rubber latex present in an amount in the range of from about 50% to about 80% by weight of the composition, an effective amount of a vulcanizing agent and an effective amount of a vulcanizing activator. This composition is also usually foamed and can contain a hydratable gelling agent and a solid filler material to impart desired density and rigidity to the composition.

When foamed, the compositions of this invention include a gas present in an amount sufficient to foam the composition, an effective amount of a foaming agent and an effective amount of a foam stabilizer.

The methods of this invention basically comprise the steps of introducing a polymeric composition of this invention into a subterranean zone or formation which when polymerized or polymerized and vulcanized forms a highly pliable impermeable mass of desired weight, durability, rigidity and/or compressibility, and then causing the composition to polymerize or polymerize and vulcanize in the zone or formation.

It is, therefore, a general object of the present invention to provide polymeric well completion and remedial compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides polymerizable compositions which form highly pliable impermeable masses having desired densities, durabilities, degrees of rigidity and/or compressibilities for use in well completion and remedial operations. The compositions and methods can be used in remedial operations where cracks, holes and the like are repaired. They are particularly suitable for use in well completion operations including supporting casing or liners in well bores and sealing the annuluses between the casing or liners and the walls of the well bores to provide zonal isolation therein. The compositions and methods are also useful for providing compressible containment caps in uncemented portions of the annuluses of wells and providing highly pliable, durable and compressible compositions in the annuluses of wells subject to subsidence, cave-ins and the like. Generally, the compositions and methods of this invention can be utilized to place a sealing impermeable mass of desired density, durability, rigidity and/or compressibility in a subterranean location which is highly resistant to impacts, shocks, cave-ins, supported pipe movements and the like.

As mentioned above, a non-foamed polymeric composition of this invention is basically comprised of water, a water soluble polymerizable monomer present in an amount in the range of from about 5% to about 30% by weight of the composition, an effective amount of a polymerization initiator and an effective amount of an oxygen scavenging agent. A hydratable gelling agent is generally also included in the composition in an amount in the range of from about 0.25% to about 2% by weight of water in the composition along with a solid filler material present in an amount sufficient to impart a desired density and/or degree of rigidity to the polymerized composition.

The water used to form the polymeric compositions of this invention can be from any source provided it does not contain an excess of compounds that adversely affect other components in the polymeric compositions. For example, the water can be fresh water, seawater, brine or water containing various concentrations of one or more salts.

A variety of water soluble polymerizable monomers can be utilized in the polymeric compositions. Examples of such monomers include acrylic acid, methacrylic acid, acrylamide, methacrylamide, 2-methacrylamido-2-methyl propane sulfonic acid, 2-acrylamido-2-methyl propane sulfonic acid, N-N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid and methacryloyloxyethyl trimethylammonium sulfate and mixtures thereof.

Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof. Of the various monomers that can be used, hydroxyethylacrylate is most preferred.

The monomer or monomers are combined with the water in amounts whereby they are present in the resulting composition in the range of from about 5% to about 30% by weight of the composition. Preferably, the monomer or monomers are present in the composition in an amount in the range of from about 10% to about 20% by weight of the composition, most preferably in an amount of about 15%.

Various polymerization initiators can be utilized in accordance with this invention, i.e., the polymerization initiator can be any suitable water soluble compound or compounds which form free radicals in aqueous solutions. Such compounds include, but are not limited to, alkali metal persulfates, such as sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper(I), Iron(III), chlorite and hydrogen peroxide.

Azo polymerization initiators defined by the following formula are particularly suitable for use in accordance with this invention:

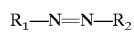

wherein:

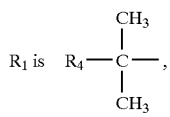

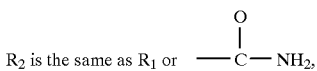

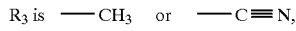

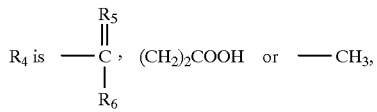

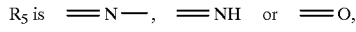

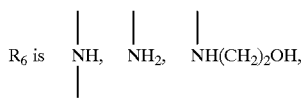

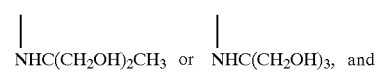

-continued

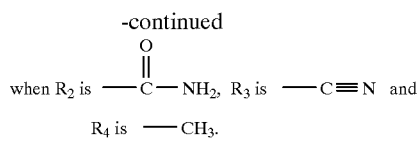

Azo polymerization initiators within the scope of the above formula are temperature activated at various temperatures and are not activated by oxidation-reduction mechanisms. The term "activation temperature" is used herein to mean that temperature at which half the molar amount of a compound converts to free radicals in a period of 10 hours.

As is understood by those skilled in the art, a particular azo polymerization initiator can be selected for use in a polymeric composition of this invention which has an activation temperature equal to or slightly less than the temperature of the subterranean zone to be sealed. Further, since the azo compounds are not activated by oxidation-reduction mechanisms, the reducing metals commonly encountered in pumping equipment and tubular goods of wells do not cause premature gelation of the polymeric composition.

The azo polymerization initiators which are generally useful in accordance with this invention have activation temperatures ranging from about 111° F. to about 190° F. Examples of preferred such azo compounds are 2,2'-azobis (N,N'-dimethylene isobutyramidine) dihydrochloride, 2,2'-azobis(2-amidinopropane) dihydrochloride, and 2,2'-azobis [2-methyl-N-(2-hydroxyethyl) propionamide]. The activation temperatures of these initiators are 111° F., 133° F. and 187° F., respectively. The quantity of the azo initiator employed is an amount in the range of from about 0.1% to about 5% by weight of monomer in the composition.

Encapsulated initiators such as alkali metal persulfates encapsulated with a slowly water soluble material can be utilized to prevent premature polymerization during mixing or pumping. Such encapsulated initiators are generally mixed with the polymeric composition in an amount in the range of from about 0.25% to about 5% by weight of monomer in the composition.

When the subterranean location in which the polymeric composition is placed is relatively cool as compared to the surface mixing temperature, e.g., below the mud line in offshore well operations, a secondary initiator such as triethanolamine can be included in the composition. The secondary initiator reacts with the primary initiator, e.g., a persulfate, to provide radicals at a lower temperature. A polymer cross-linking agent such as N,N-methylene bis acrylamide can also be added to the polymeric composition to increase the stiffness of the sealing mass formed.

The presence of oxygen in the polymeric composition inhibits the polymerization process. Therefore, an oxygen scavenger such as stannous chloride is included in the composition. When used, stannous chloride is generally dissolved in a 0.5% by weight aqueous hydrochloric acid solution in an amount of about 10% by weight of the solution. The resulting stannous chloride-hydrochloric acid solution is combined with the polymeric composition in an amount in the range of from about 5% to about 10% by weight of the composition.

A hydratable gelling agent can be combined with the polymeric composition to provide viscosity thereto whereby a solid filler material can be suspended in the composition. Particularly suitable gelling agents for use in accordance with this invention include cellulose derivatives, guar gum and derivatives thereof, polyacrylamide, polyvinylpyrrolidone, polyvinyl alcohol and mixtures thereof. Of these, hydroxyethylcellulose is the most preferred. The hydratable gelling agent or agents utilized are generally included in the polymeric composition in an amount in the range of from about 0.25% to about 2% by weight of water in the composition, most preferably in an amount of about 0.75%. A cross-linking agent such as one or more water soluble multivalent metal compounds can be added to the polymeric composition to increase its viscosity and solids suspending capacity.

The solid filler material utilized functions to provide a desired density and/or degree of rigidity to the polymerized composition. That is, the particular filler material or materials utilized and their amounts in the polymeric composition are adjusted to impart a desired density and/or degree of rigidity to the polymerized composition. While a variety of filler materials which are well known to those skilled in this art can be utilized, preferred filler materials are ground crystalline silica such as ultra fine crystalline silica having an average particle size of about 5 microns, barite, clays, solid materials which hydrate in the presence of water such as hydraulic cements and pozzolan materials, and mixtures of such filler materials. Generally, the filler material used is included in the polymeric composition of this invention in an amount in the range of from about 20% to about 50% by weight of the composition.

In most applications including those involving the completion of wells penetrating formations of low fracture gradient, a foamed polymeric composition of this invention is used. That is, a gas such as nitrogen is included in the composition in an amount sufficient to foam the composition and produce a density in the range of from about 6 pounds per gallon to about 10 pounds per gallon. In addition, an effective amount of a foaming agent and an effective amount of a foam stabilizer are included in the composition.

While various foaming agents can be utilized in a foamed polymeric composition of this invention, particularly suitable foaming agents are surfactants having the general formula

wherein a is an integer in the range of from about 5 to about 15, b is an integer in the range of from about 1 to about 10, and X is any compatible cation.

A preferred foaming agent is a surfactant of the above type having the formula

wherein a is an integer in the range of from about 6 to about 10. This surfactant is commercially available from Halliburton Energy Services of Duncan, Okla., under the trade designation "CFA-S™."

Another preferred foaming agent of the above mentioned type is a surfactant having the formula

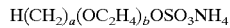

wherein a is an integer in the range of from about 5 to about 15, and b is an integer in the range of from about 1 to about 10. This surfactant is available from Halliburton Energy Services under the trade name "HALLIBURTON FOAM ADDITIVE™."

Another preferred foaming agent which can be utilized in the polymeric compositions of this invention includes polyethoxylated alcohols having the formula

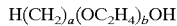

$$H(CH_2)_a(OC_2H_4)_bOH$$

wherein a is an integer in the range of from about 10 to about 18, and b is an integer in the range of from about 6 to about 15. This surfactant is available from Halliburton Energy Services under the trade name "AQF-1™."

Still another preferred foaming surfactant which can be used is an alcohol ether sulfate of the formula

$$H(CH_2)_a(OC_2H_4)_bSO_3NH_4$$

wherein a is an integer in the range of from about 6 to about 10, and b is an integer in the range of from about 3 to about 10.

The most preferred foaming agent for use in accordance with the present invention is a sodium salt of alpha-olefinic sulfonic acid (AOS) which is a mixture of compounds of the formulas

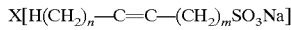

$$X[H(CH_2)_n-C=C-(CH_2)_mSO_3Na]$$

and

$$Y[H(CH_2)_p-COH-(CH_2)_qSO_3Na]$$

wherein n and m are individually integers in the range of from about 6 to about 16, p and q are individually integers in the range of from about 7 to about 17, and X and Y are fractions with the sum of X and Y being 1. This foaming agent is available from Halliburton Energy Services under the trade name "AQF-2™."

The particular foaming agent employed will depend on various factors such as the types of formations in which the foamed composition is to be placed. Generally, the foaming agent utilized is included in a polymeric composition of this invention in an amount in the range of from about 0.75% to about 2% by weight of water in the composition. When the foaming agent is one of the preferred surfactants described above, it is included in the composition in an amount in the range of from about 1% to about 2% by weight of water therein.

A foam stabilizer is also included in the foamed polymeric compositions to enhance their stability. One such foam stabilizing agent is a compound of the formula

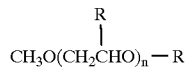

$$\begin{array}{c} R \\ | \\ CH_3O(CH_2CHO)_n-R \end{array}$$

wherein R is hydrogen or a methyl radical, and n is an integer in the range of from about 20 to about 200.

A preferred foam stabilizing agent of the above type is a methoxypolyethylene glycol of the formula:

$$CH_3O(CH_2CH_2O)_nCH_2OH$$

wherein n is in the range of from about 100 to about 150. This foam stabilizing agent is commercially available from Halliburton Energy Services under the trade designation "HALLIBURTON FOAM STABILIZER™."

Another preferred foam stabilizing agent is a compound having the formula

$$R-CONHCH_2CH_2CH_2N^+(CH_3)_2CH_2CO_2^-$$

wherein R is a $C_{10}$ to $C_{18}$ saturated aliphatic hydrocarbon group or an oleyl group or a linoleyl group.

The most preferred stabilizing agent of the above type is an amidopropylbetaine of the formula

$$R-CONHCH_2CH_2CH_2N^+(CH_3)_2CH_2CO_2^-$$

wherein R is a cocoyl group. This foam stabilizing agent is commercially available from Halliburton Energy Services under the trade designation "HC-2™."

The foam stabilizer used is included in a polymeric composition of this invention in an amount in the range of from about 0.5% to about 1.5% by weight of water utilized. When the foam stabilizing agent is one of the particularly preferred agents described above, it is preferably present in the composition in an amount in the range of from about 0.75% to about 1% by weight of water.

Another composition of this invention which forms a highly pliable impermeable mass having high degrees of durability and bond strength and which can be utilized in the non-foamed or foamed states is comprised of water, a water soluble polymerizable monomer of the type described above present in an amount in the range of from about 5% to about 30% by weight of the composition, an effective amount of a polymerization initiator of the type described above, an effective amount of an oxygen scavenging agent of the type described above, a vulcanizable aqueous rubber latex present in an amount in the range of from about 50% to about 80% by weight of the composition, an effective amount of a vulcanizing agent and an effective amount of vulcanizing activator.

The water in the aqueous latex can be adequate to dissolve the polymerizable monomers and other components in the composition and form a pumpable composition. However, additional water of the type described above can be added if necessary.

A variety of well known rubber materials can be utilized in accordance with the present invention. Such materials are commercially available in aqueous latex form, i.e., aqueous dispersions or emulsions. For example, natural rubber (cis-1,4-polyisoprene) and most of its modified types can be utilized. Synthetic polymers of various types can also be used including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable styrene/butadiene aqueous latex has a styrene/butadiene weight ratio of about 25%:75%, and the styrene/butadiene copolymer is suspended in a 50% by weight aqueous emulsion. This styrene/butadiene aqueous latex in combination with the other components of the cement compositions of this invention provides excellent resiliency to a set cement composition without the appreciable loss of bond strength in the set cement. A latex of this type is available from Halliburton Energy Services of Duncan, Okla. under the trade designation "LATEX 2000™." The aqueous latex used is included in the polymeric compositions of this invention in an amount in the range of from about 50% to about 80% by weight of the composition, more preferably from about 60% to about 70% and most preferably about 65%.

In order to prevent the aqueous latex from prematurely coagulating and increasing the viscosity of the cement composition, an effective amount of a latex stabilizer can be included in the cement composition. Latex stabilizers are comprised of one or more surfactants which function to prevent latex coagulation. Those which are particularly suitable for use in accordance with the present invention are surfactants having the formula $$R_7(OR_8)_pSO_3X$$

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant of this type is the sodium salt of a sulfonated compound derived by reacting a $C_{12}$ to $C_{16}$ alcohol with about 40 moles of ethylene oxide having the formula $$H(CH_2)_{12-16}(CH_2CH_2O)_{40}SO_3Na$$

which is commercially available under the name "AVANEL S400™" from PPG Mazer, Mazer Chemicals, a Division of PPG Industries, Inc., 3938 Porett Drive, Gurnee, Ill. 60031.

Vulcanization of the rubber is the process that converts the rubber latex to a solid elastic and resilient state. The vulcanization process involves the crosslinking of the polymer chains and can be accomplished by incorporating one or more vulcanizing agents in the rubber latex composition. The most common vulcanizing agent which can be utilized with a majority of the rubber materials described above is sulfur. Other compounds that can be used either with or without sulfur are organic peroxide compounds, azo compounds, phenolic curatives, benzoquinone derivatives, bismaleimides, selenium tellurium, nitro compounds, resins, metal oxides and organic sulfur compounds such as alkyl thiuram disulfides.

The rate of vulcanization increases exponentially with increases in temperature, and the time required for the vulcanization of a particular rubber latex can be varied over a wide range by the selection of a particular vulcanizing agent, vulcanizing accelerator or premature vulcanization inhibitor or mixtures of such components. In order to initiate the vulcanization, a vulcanization activator is generally included in the rubber latex composition. Particularly suitable vulcanization activators are fatty acids such as stearic acid, metallic oxides such as zinc oxide and mixtures of such compounds.

In order to shorten the vulcanization time beyond that obtainable by the selection of vulcanizing agents alone, a vulcanization accelerator can be included in the rubber latex composition. Such accelerators generally function to initiate free radicals and they are preferably selected from the group consisting of aldehyde amine compounds, guanidine compounds, sulfenamide compounds, thiuram sulfide compounds, thiazole compounds, thiazoline compounds, dithiocarbamate compounds and mercaptiomidazoline compounds.

The polymeric compositions containing an aqueous rubber latex and other related components can also include a defoaming agent to prevent foaming during mixing such as a polydimethylsiloxane, a gelling agent to provide viscosity to the composition and a solid filler material as described above to increase the densities and/or rigidities of the impermeable masses formed. In addition, when the compositions are foamed they include a gas present in an amount sufficient to foam the composition, an effective amount of a foaming agent as described above and an effective amount of a foam stabilizer as described above.

As mentioned above, upon polymerization, the polymeric compositions disclosed herein are highly pliable and the components of the compositions can be varied in kind and amount to obtained desired properties such as density, durability, degree of rigidity and compressibility. In addition, the polymerized compositions are highly adhesive whereby they readily bond to pipe surfaces and the faces of subterranean formation materials. In order to provide other desired properties to the polymerized compositions, they can include other additives which are well known to those skilled in the art including fluid loss control additives, dispersing agents, formation conditioning additives, accelerators and the like so long as such additives do not adversely affect any of the components in the polymeric compositions.

The methods of this invention of conducting completion or remedial operations in a subterranean zone or formation penetrated by a well bore are basically comprised of the steps of introducing a polymeric composition of this invention into the subterranean zone or formation which when polymerized or polymerized and vulcanized forms a highly pliable impermeable mass of desired density, durability, rigidity and/or compressibility, and then causing the composition to polymerize or polymerize and vulcanize in the zone or formation. The highly durable polymeric compositions containing an aqueous rubber latex and other related components are caused to vulcanize at substantially the same time as the polymerizable monomers contained therein are caused to polymerize.

In order to further illustrate the improved polymeric compositions and methods of this invention, the following examples are given.

EXAMPLE 1

Non-foamed polymeric compositions of this invention were prepared containing various quantities of seawater, hydroxyethylacrylate monomer, an azo initiator comprised of 2,2-azobis(2-amidinopropane) dihydrochloride and an oxygen scavenger comprised of stannous chloride. The stannous chloride was added to the compositions dissolved in a 0.5% by weight aqueous hydrochloric acid solution in an amount of about 10% by weight of the solution. In addition, the non-foamed polymeric compositions included hydroxyethylcellulose gelling agent and ultra fine crystalline silica having an average particle size of about 5 microns. The components of the compositions and their quantities are set forth in Table I below.

TABLE I

Non-Foamed Test Compositions

Components, parts by weight

| No. | Sea-water[1] | Monomer[2] | Initiator[3] | $O_2$ Scavenger[4] | Filler[5] | Gelling Agent[6] |
|---|---|---|---|---|---|---|
| 1 | 824 | 149.85 | 1.2 | 30 | — | — |
| 2 | 824 | 149.85 | 2.4 | 30 | — | — |
| 3 | 879 | 99.9 | 2.4 | 30 | — | — |
| 4 | 824 | 149.85 | 4.8 | 30 | — | — |
| 5 | 794 | 149.85 | 4.8 | 60 | — | — |
| 6 | 824 | 149.85 | 4.8 | 30 | — | — |
| 7 | 770 | 199.8 | 4.8 | 60 | — | — |
| 8 | 770 | 199.8 | 1.2 | 60 | 600 | 6.3 |
| 9 | 879 | 99.9 | 1.2 | 30 | 600 | 6.3 |
| 10 | 824 | 149.85 | 0.6 | 30 | 600 | 6.3 |

[1]Synthetic seawater
[2]Hydroxyethylacrylate
[3]2,2-azobis(2-amidinopropane) dihydrochloride
[4]10% by weight stannous chloride in a 0.5% by weight aqueous HCl solution
[5]5 micron sized crystalline silica
[6]Hydroxyethylcellulose The above identified non-foamed compositions were allowed to polymerize. Upon polymerization, the compositions all formed pliable impermeable masses having sufficient rigidity.

EXAMPLE 2

Foamed compositions of this invention having various quantities of components were prepared. The components in the compositions and their quantities are set forth in Table II below.

TABLE II

Foamed Test Compositions

Components, parts by weight

| No. | Seawater[1] | Monomer[2] | Initiator[3] | $O_2$ Scavenger[4] | Filler[5] | Gelling Agent[6] | Foaming Agent | Foam Stabilizer |
|---|---|---|---|---|---|---|---|---|
| 1 | 824 | 149.85 | 1.2 | 30 | 600 | 6.3 | 20[7] | 20[8] |
| 2 | 824 | 149.85 | 2.4 | 30 | 600 | 6.3 | 20[7] | 20[8] |
| 3 | 879 | 99.9 | 2.4 | 30 | 600 | 6.3 | 20[7] | 20[8] |
| 4 | 824 | 149.85 | 4.8 | 30 | 600 | 6.3 | 20[7] | 20[8] |
| 5 | 794 | 149.85 | 4.8 | 60 | 600 | 6.3 | 20[7] | 20[8] |
| 6 | 824 | 149.85 | 4.8 | 30 | 600 | 6.3 | 10[7] | 5[8] |
| 7 | 770 | 199.8 | 4.8 | 60 | 600 | 6.3 | 10[7] | 5[8] |
| 8 | 770 | 199.8 | 1.2 | 60 | 600 | 6.3 | 10[9] | 5[10] |
| 9 | 879 | 99.9 | 1.2 | 30 | 600 | 6.3 | 10[9] | 5[10] |
| 10 | 824 | 149.85 | 0.6 | 30 | 600 | 6.3 | 10[9] | 5[10] |

[1]Synthetic seawater
[2]Hydroxyethylacrylate
[3]2,2-azobis(2-amidinopropane) dihydrochloride
[4]10% by weight stannous chloride in a 0.5% by weight aqueous HCl solution
[5]5 micron sized crystalline silica
[6]Hydroxyethylcellulose
[7]Alpha olefin sulfonate surfactant
[8]Cocoamido propyl betaine surfactant
[9]Sulfated linear alcohol ethoxylate surfactant
[10]"CARBOWAX ™" (5000 MW) methoxypolyethylene glycol The test polymeric compositions were allowed to polymerize. Upon polymerization, the compositions formed pliable impermeable masses having compressibility and sufficient rigidity.

EXAMPLE 3

Non-foamed and foamed test polymeric compositions of this invention containing rubber latex having various quantities of components were prepared. The components and their quantities are given in Table 3 below.

TABLE III

Non-Foamed And Foamed Test Compositions Containing Rubber

Components, parts by weight

| No. | Monomer[1] | Initiator[2] | $O_2$ Scavenger[3] | Gelling Agent[4] | Latex[5] | Latex Stabilizer[6] | Defoamer[7] | Vulcanizing Agent[8] | Vulcanizing Activator[9] | Vulcanizing Accelerator[10] | Filler[11] | Foaming Agent[12] | Foam Stabilizer[13] |
|---|---|---|---|---|---|---|---|---|---|---|---|---|---|
| 1 | 50 | 0.6 | 10 | 1.2 | 300 | 45 | 22.5 | 12 | 15 | 3 | — | — | — |
| 2 | 50 | 1.8 | 30 | 1.2 | 300 | 45 | 22.5 | 12 | 15 | 3 | — | — | — |
| 3 | 50 | 1.15 | 30 | 1.2 | 300 | 45 | 22.5 | 12 | 15 | 3 | — | 10 | 5 |
| 4 | 50 | 1.15 | 30 | 0.6 | 300 | 45 | 22.5 | 12 | 15 | 3 | 200 | 10 | 5 |

[1]Hydroxyethylacrylate
[2]2,2-azobis(2-amidinopropane)dihydrochloride
[3]10% by wt. stannous chloride in a 0.5% by wt. aqueous HCl solution
[4]Hydroxyethylcellulose
[5]Aqueous styrene/butadiene (25%:75% by wt.) latex containing 50% by wt. water
[6]Sodium salt of sulfonated and ethoxylated compound having the formula $H(CH_2)_{12-16}(CH_2CH_2O)_{40}SO_3Na$
[7]Polydimethylsiloxane
[8]Sulfur
[9]Stearic acid and zinc oxide mixture
[10]2,2'-dithiobisbenzothiazole and copper dimethyldithiocarbamate mixture
[11]Crystalline silica
[12]Sodium salt of alpha-olefinic sulfonic acid
[13]Cocylamidopropylbetaine The test compositions were allowed to polymerize. Upon polymerization and vulcanization, the compositions formed durable, pliable impermeable masses having good rigidity.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. A polymeric composition which forms a pliable and durable impermeable mass for use in well completion or remedial operations comprising:

water;

a water soluble polymerizable monomer present in an amount in the range of from about 5% to about 30% by weight of said composition;

a polymerization initiator present in an amount effective to initiate the polymerization of said polymerizable monomer;

an oxygen scavenging agent present in an amount effective to remove oxygen from said composition;

a vulcanizable aqueous rubber latex present in an amount in the range of from &bout 50% to about 80% by weight of said composition;

a vulcanizing agent present in an amount effective to vulcanize said aqueous rubber latex;

a vulcanizing activator present in an amount sufficient to initiate the vulcanization of said aqueous rubber latex by said vulcanizing agent;

a gas present in an amount sufficient to foam said composition;

a foaming agent Present in an amount effective to facilitate foaming; and a foam stabilizer present in an amount effective to stabilize said composition when foamed.

2. The composition of claim 1 wherein said monomer is selected from the group of hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof.

3. The composition of claim 1 wherein said monomer comprises hydroxyethylacrylate.

4. The composition of claim 1 wherein said polymerization initiator is selected from the group of 2,2'-azobis(N,N'-dimethylene isobutyramidine) dihydro-chloride, 2,2'-azobis (2-amidinopropane) dihydrochloride, 2,2'-azobis[2-methyl-N-(2-hydroxyethyl) propionamide], alkali metal persulfates, peroxides and oxidation-reduction systems.

5. The composition of claim 4 wherein said polymerization initiator is present in an amount in the range of from about 0.1% to about 5% by weight of monomer in said composition.

6. The composition of claim 1 wherein said oxygen scavenging agent comprises stannous chloride.

7. The composition of claim 1 wherein said aqueous rubber latex is selected from the group of natural rubber (cis-1,4-polyisoprene) and its modified types and synthetic polymers including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

8. The composition of claim 1 wherein said aqueous rubber latex is an aqueous styrene/butadiene latex.

9. The composition of claim 8 wherein said aqueous styrene/butadiene latex contains water in an amount of about 50% by weight of said latex, and the weight ratio of styrene to butadiene in said latex is about 25%:75%.

10. The composition of claim 1 wherein said vulcanizing agent is selected from the group of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

11. The composition of claim 1 wherein said vulcanization activator is selected from the group of fatty acids, metallic oxide compounds and mixtures of such compounds.

12. The composition of claim 1 wherein said foaming agent is comprised of a sodium salt of an alpha-olefinic sulfonic acid present in an amount in the range of from about 1% to about 2% by weight of water in said composition.

13. The composition of claim 1 wherein said foam stabilizer is comprised of an amidopropylbetaine of the formula

wherein R is a cocoyl group, present in an amount in the range of from about 0.75% to about 1% by weight of water in said composition.

14. A polymeric composition which forms a pliable and durable impermeable mass for use in well completion or remedial operations comprising:
    water;
    a water soluble polymerizable monomer comprising hydroxyethylacrylate present in an amount in the range of from about 5% to about 30% by weight of said composition;
    a polymerization initiator selected from the group of 2,2'-azobis(N,N'-dimethylene isobutyramidine) dihydrochloride, 2,2'-azobis(2-amidinopropane) dihydrochloride, and 2,2'-azobis[2-methyl-N-(2-hydroxyethyl) propionamide] present in an amount in the range of from about 0.1% to about 5% by weight of said composition;
    an oxygen scavenger comprised of stannous chloride present in an amount effective to remove oxygen from said composition;
    an aqueous styrene/butadiene latex containing water in an amount of about 50% by weight of said latex and having a weight ratio of styrene to butadiene of about 25%:75% present in an amount in the range of from about 50% to about 80% by weight of said composition;
    a vulcanizing agent comprising sulfur present in an amount effective to vulcanize said aqueous styrene/butadiene latex; and
    a vulcanizing activator comprising a mixture of stearic acid and zinc oxide present in an amount sufficient to initiate the vulcanization of said aqueous styrene/butadiene latex by said vulcanizing agent;
    a gas present in an amount sufficient to foam said compositions;
    a foaming agent present in an amount effective to facilitate foaming; and
    a foam stabilizer present in an amount effective to stabilizer said composition when foamed.

15. The composition of claim 14 wherein said foaming agent is comprised of a sodium salt of an alpha-olefinic sulfonic acid present in an amount in the range of from about 1% to about 2% by weight of water in said composition.

16. The composition of claim 14 wherein said foam stabilizer is comprised of an amidopropylbetaine of the formula

wherein R is a cocoyl group, present in an amount in the range of from about 0.75% to about 1% by weight of water in said composition.

17. A method of sealing a subterranean zone penetrated by a well bore comprising the steps of:
    introducing an aqueous composition into said zone which forms a pliable and durable impermeable sealing mass, said composition comprising water, a water soluble polymerizable monomer, a polymerization initiator, an oxygen scavenging agent, a vulcanizable aqueous rubber latex, a vulcanizing agent and a vulcanizing activator; and then
    causing said monomer to polymerize and said rubber latex to vulcanize.

18. The method of claim 17 wherein said monomer in said composition is selected from the group of hydroxyethylacrylate, hydroxymethylacrylate, hydroxyethylmethacrylate, N-hydroxy-methylacrylamide, N-hydroxymethylmethacrylamide, polyethylene and polypropylene glycol acrylate and methacrylate and mixtures thereof.

19. The method of claim 17 wherein said monomer in said composition comprises hydroxyethylacrylate.

20. The method of claim 17 wherein said polymerization initiator in said composition is selected from the group of 2,2'-azobis(N,N'-dimethylene isobutyramidine) dihydrochloride, 2,2'-azobis(2-amidinopropane) dihydrochloride, 2,2'-azobis[2-methyl-N-(2-hydroxyethyl) propionamide], alkalimetal persulfates, peroxides and oxidation-reduction systems.

21. The method of claim 17 wherein said polymerization initiator in said composition is present therein in an amount in the range of from about 0.1% to about 5% by weight of monomer in said composition.

22. The method of claim 17 wherein said oxygen scavenging agent in said composition comprises stannous chloride.

23. The method of claim 17 wherein said aqueous rubber latex in said composition is selected from the group of natural rubber (cis-1,4-polyisoprene) and its modified types and synthetic polymers including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

24. The method of claim 17 wherein said aqueous rubber latex in said composition is an aqueous styrene/butadiene latex.

25. The method of claim 17 wherein said aqueous rubber latex in said composition is an aqueous styrene/butadiene latex containing water in an amount of about 50% by weight of said latex and the weight ratio of styrene to butadiene in said latex is about 25%:75%.

26. The method of claim 17 wherein said vulcanizing agent in said composition is selected from the group of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

27. The method of claim 17 wherein said vulcanization activator in said composition is selected from the group consisting of fatty acids, metallic oxide compounds and mixtures of such compounds.

28. The method of claim 17 wherein said composition further comprises:

a gas present in an amount sufficient to foam said compositions;

a foaming agent present in an amount effective to facilitate foaming; and a foam stabilizer present in an amount effective to stabilizer said composition when foamed.

29. The method of claim 28 wherein said foaming agent in said composition is comprised of a sodium salt of an alpha-olefinic sulfonic acid present in an amount in the range of from about 1% to about 2% by weight of water in said composition.

30. The method of claim 19 wherein said foam stabilizer in said composition is comprised of an amidopropylbetaine of the formula

$$R-CONHCH_2CH_2CH_2N^+(CH_3)_2CH_2CO_2^-$$

wherein R is a cocoyl group, present in an amount in the range of from about 0.75% to about 1% by weight of water in said composition.

31. A method of sealing a subterranean zone penetrated by a well bore comprising the steps of introducing an aqueous composition into said zone which forms a pliable and durable impermeable sealing mass, said composition comprising:

water;

a water soluble polymerizable monomer comprising hydroxethylacrylate present in an amount in the range of from about 5% to about 30% by weight of water in said composition;

a polymerization initiator selected from the group of 2,2'-azobis(N,N'-dimethylene isobutyramidine) dihydrochloride, 2,2'-azobis(2-amidinopropane) dihydrochloride, and 2,2'-azobis[2-methyl-N-(2-hydroxyethyl) propionamide] present in an amount in the range of from about 0.1% to about 5% by weight of said composition;

an oxygen scavenger comprising stannous chloride present in an amount effective to remove oxygen from said composition;

an aqueous styrene/butadiene latex containing water in an amount of about 50% by weight of said latex and having a weight ratio of styrene to butadiene of about 25%:75% present in an amount in the range of from about 50% to about 80% by weight of said composition;

a vulcanizing agent comprising sulphur present in an amount effective to vulcanize said aqueous rubber latex;

a vulcanizing activator comprising a mixture of stearic acid and zinc oxide present in an amount defective to initiate the vulcanization of said aqueous rubber latex by said vulcanizing agent; and then causing said monomer to polymerize and said rubber latex to vulcanize.

32. The method of claim 31 wherein said composition further comprises:

a gas present in an amount sufficient to foam said composition;

a foaming agent present in an amount effective to facilitate foaming; and a foam stabilizer present in an amount effective to stabilize said composition when foamed.

33. The method of claim 32 wherein said foaming agent is comprised of a sodium salt of an alpha-olefinic sulfonic acid present in an amount in the range of from about 1% to about 2% by weight of water in said composition.

34. The method of claim 33 wherein said foam stabilizer is comprised of an amidopropylbetaine of the formula

$$R-CONHCH_2CH_2CH_2N^+(CH_3)_2CH_2CO_2^-$$

wherein R is a cocoyl group, present in an amount in the range of from about 0.75% to about 1% by weight of water in said composition.

* * * * *